(12) United States Patent
Rasmussen

(10) Patent No.: US 8,263,210 B2
(45) Date of Patent: Sep. 11, 2012

(54) CROSSLAMINATE OF ORIENTED FILMS AND METHODS AND APPARATUS FOR MANUFACTURING SAME

(76) Inventor: Ole-Bendt Rasmussen, Walchwil (CH)

(*) Notice: Subject to any disclaimer, the term of this patent is extended or adjusted under 35 U.S.C. 154(b) by 819 days.

(21) Appl. No.: 11/920,187

(22) PCT Filed: May 11, 2006

(86) PCT No.: PCT/EP2006/062260
§ 371 (c)(1),
(2), (4) Date: Feb. 2, 2009

(87) PCT Pub. No.: WO2006/120238
PCT Pub. Date: Nov. 16, 2006

(65) Prior Publication Data
US 2009/0233041 A1    Sep. 17, 2009

(30) Foreign Application Priority Data

May 11, 2005  (GB) .................................. 0509615.1
Jun. 3, 2005  (GB) .................................. 0511394.9
Jan. 5, 2006  (WO) ................. PCT/EP2006/000281

(51) Int. Cl.
*B32B 1/00* (2006.01)
*B32B 3/00* (2006.01)
*B32B 27/14* (2006.01)
*B32B 3/28* (2006.01)
*B32B 3/30* (2006.01)

(52) U.S. Cl. .......................... 428/174; 428/182; 428/198

(58) Field of Classification Search .................. 428/174, 428/182, 172, 35.2, 198
See application file for complete search history.

(56) References Cited

U.S. PATENT DOCUMENTS

| 3,954,933 | A | 5/1976 | Rasmussen |
| 4,039,364 | A | 8/1977 | Rasmussen |
| 4,084,028 | A | 4/1978 | Rasmussen |
| 4,115,502 | A | 9/1978 | Rasmussen |
| 4,125,581 | A | 11/1978 | Rasmussen |
| 4,143,195 | A | 3/1979 | Rasmussen |
| 4,207,045 | A | 6/1980 | Rasmussen |
| 4,229,394 | A | 10/1980 | Rasmussen |
| 4,275,630 | A | 6/1981 | Goldsmith et al. |
| 4,293,294 | A | 10/1981 | Rasmussen |

(Continued)

FOREIGN PATENT DOCUMENTS

WO     WO 02102592 A1 * 12/2002

(Continued)

OTHER PUBLICATIONS

PCT International Search Report, 2006.

*Primary Examiner* — Catherine A Simone
(74) *Attorney, Agent, or Firm* — Robert W Strozier

(57) ABSTRACT

A crosslaminate is formed from two oriented plies of thermoplastic polymer material, arranged so that their orientation directions cross one another, the plies being heat sealed together. Each ply is semi-fibrillated, that is consist of linear thin regions of biaxially oriented material and thicker linear bosses between the thinner regions. The webs are sealed primarily through bonds formed at the intersection of the bosses (thicker regions). The array of bosses has a division less than 2 mm. The laminate has improved aesthetic and strength properties. A method for forming the crosslaminate involves segmental stretching of the material to form the thinner regions, and apparatus comprising intermeshing grooved stretching rollers having sharp-edged crests is described.

31 Claims, 8 Drawing Sheets

U.S. PATENT DOCUMENTS

| | | | |
|---|---|---|---|
| 4,294,638 A | 10/1981 | Rasmussen |
| 4,368,017 A | 1/1983 | Rasmussen |
| 4,377,544 A | 3/1983 | Rasmussen |
| 4,403,934 A | 9/1983 | Rasmussen |
| 4,407,877 A | 10/1983 | Rasmussen |
| 4,420,451 A | 12/1983 | Rasmussen |
| 4,421,810 A | 12/1983 | Rasmussen |
| 4,422,837 A | 12/1983 | Rasmussen |
| 4,430,284 A | 2/1984 | Rasmussen |
| 4,436,568 A | 3/1984 | Rasmussen |
| 4,440,709 A | 4/1984 | Rasmussen |
| 4,465,724 A | 8/1984 | Rasmussen |
| 4,492,549 A | 1/1985 | Rasmussen |
| 4,629,525 A | 12/1986 | Rasmussen |
| 4,636,417 A | 1/1987 | Rasmussen |
| 4,767,488 A | 8/1988 | Rasmussen |
| 4,793,885 A | 12/1988 | Rasmussen |
| 4,874,653 A | 10/1989 | Rasmussen |
| 4,908,253 A | 3/1990 | Rasmussen |
| 5,028,289 A | 7/1991 | Rasmussen |
| 5,205,650 A | 4/1993 | Rasmussen |
| 5,248,366 A | 9/1993 | Rasmussen |
| 5,330,133 A | 7/1994 | Rasmussen |
| 5,361,469 A | 11/1994 | Rasmussen |
| 5,626,944 A | 5/1997 | Rasmussen |
| 6,344,258 B1 | 2/2002 | Rasmussen |
| 6,787,206 B2 | 9/2004 | Rasmussen |
| 6,887,503 B1 | 5/2005 | Rasmussen |
| 7,001,547 B2 | 2/2006 | Rasmussen |
| 7,132,151 B2 | 11/2006 | Rasmussen |
| 2004/0070105 A1 | 4/2004 | Rasmussen |
| 2004/0247730 A1 | 12/2004 | Rasmussen |
| 2005/0095411 A1 | 5/2005 | Rasmussen |
| 2005/0118304 A1 | 6/2005 | Rasmussen |
| 2007/0082188 A1 | 4/2007 | Rasmussen |
| 2007/0254120 A1 | 11/2007 | Rasmussen |
| 2007/0257402 A1 | 11/2007 | Rasmussen |
| 2007/0290416 A1 | 12/2007 | Rasmussen |
| 2008/0035714 A1 | 2/2008 | Rasmussen |
| 2009/0206510 A1 | 8/2009 | Rasmussen |
| 2009/0233041 A1 | 9/2009 | Rasmussen |

FOREIGN PATENT DOCUMENTS

| | | | |
|---|---|---|---|
| WO | WO2004054793 A | 7/2004 | |

* cited by examiner

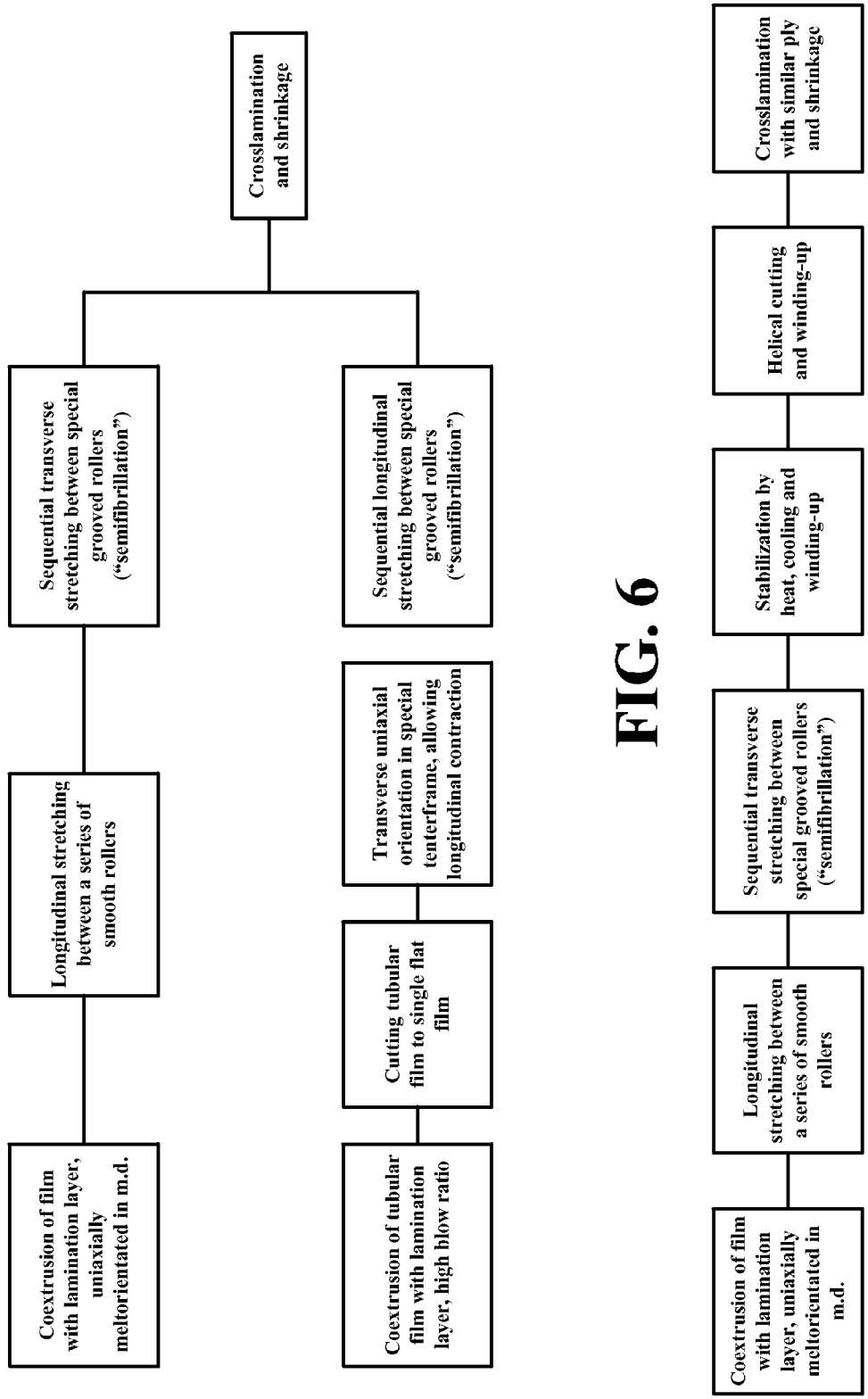

CROSSLAMINATE OF ORIENTED FILMS AND METHODS AND APPARATUS FOR MANUFACTURING SAME

RELATED APPLICATIONS

This application is a nationalization of PCT/EP2006/062260, filed 11 May 2006, published as WO 2006/120238, published 16 Nov. 2006, which claims priority to PCT/EP2006/000281, filed 5 Jan. 2006 (5 Jan. 2006), published as WO 2006/072604 A2 on 13 Jul. 2006 (13 Jul. 2006), GB 0509615.1, filed 11 May 2005 (11 May 2005) and GB 0511394.9, filed 3 Jun. 2005 (3 Jun. 2005).

BACKGROUND OF THE INVENTION

1. Field of the Invention

The present invention concerns crosslaminates.

More particularly, the present invention concerns laminates of films of which at least two are uniaxially or unbalanced biaxially oriented, and in which the main direction of orientation in one of these films crosses the main direction in the other one.

2. Description of the Related Art

Crosslaminates of oriented films from synthetic polymer materials have been commercially produced since 1968, then mainly as described in GB-A-0792976 (Rasmussen) of May 23, 1955. To the inventor's knowledge the total annual worldwide production today amounts to about 30,000 tons. The crosslaminate is used in particular as industrial bags, cover sheet, tarpaulins, pond-liners and similar products.

Compared to generally unoriented films, crosslaminates exhibit very improved strength properties, seen in relation to the square meter weight, and since the raw material price is the most important part of the costprice, the crosslamination technology can serve to reduce the cost by reduction of weight. Compared to biaxially oriented film, crosslaminates made (under adequate conditions) from similar polymers, exhibit dramatically improved tear propagation resistance.

Nevertheless, as the figure 30,000 tons annual production indicates, the success of crosslamination technology in the marketplace has been limited. An important reason for this is difficulties in maintaining a high tear propagation resistance and at the same time adequate bonding strength in relatively thin laminates, while the main advantages in particular should be the possibility to reduce the weight. The high tear propagation resistance in adequately produced crosslaminates is based on local delamination around the location where the tear propagates. Due to the unbalanced orientation in the individual films and criss-crossing of the main directions of the orientation, one film will then have a tendency to propagate the tear in one direction and another film will tend to propagate the tear in another direction. Thereby there will be a tendency to eliminate the bonding at the location where the forces are concentrated, and if this tendency is sufficiently pronounced, the tear will "fork out" under a local delamination, and the "notch effect" of the tearing will almost be eliminated. Hereby there will be, generally speaking, "competition" between the adhesive forces which try to withstand delamination, and the cohesive forces in each film which try to avoid a rupture or flow along any direction which is not parallel with the main direction of orientation. The said adhesive forces are (still generally speaking) independent of the thickness of the films, while the said cohesive forces are mainly proportional to the film thickness, when all other parameters are unchanged. As a consequence of this "competition", "thin" crosslaminates will either exhibit a relative poor tear propagation resistance or a relatively high tendency to delamination. This is much less of a problem for crosslaminates of "thick" layers. For industrial bags of gauge higher than about 60-70 grams per square meter this "competition" will usually not cause serious problems since filled bags are usually not subjected to delaminating forces, which means that a low bonding strength can be chosen, but the matter is very important e.g. for tarpaulins, cover sheets and similar products which will be subjected to repeated flexing during use, e.g. will flap in the wind. As a matter of practical experience the inventor and his licensees have found that in a tarpaulin made from a two-ply crosslaminate based on combinations of LLDPE- and HMWHDPE types, each of the films must be of a gauge of at least 45-50 gm$^{-2}$, otherwise either the bonding strength or the tear propagation resistance will be unacceptable to the users. These experiences concern tarpaulins for "static" uses where there will not occur much flapping in the wind. For "dynamic" uses such as cover over trucks or goods wagons, where the tarpaulin will be subjected to strong, repeated flapping, the gauge required is much higher. In low gauge film (e.g. of gauge between about 15-50 gm$^{-2}$ destined for the final consumer, there is also a need for a high tear propagation resistance combined with good bonding, since such tear strength is a property which the consumer easily can evaluate. Examples of such films are films for wrapping of consumer goods and the different kinds of household films.

Several methods have been suggested for achieving an adequate combination of bonding strength and tear propagation resistance in crosslaminated films. They are all described in WO03/074264 and all relate to a combination of a strong or relatively strong bonding in spots or lines, and weak bonding or no bonding over the rest of the film area. Of this known art, only the method and structure claimed in the said WO03/074264 has had industrial importance.

SUMMARY OF THE INVENTION

The main objective of the present invention is improvement of the tear propagation resistance in crosslaminates, especially but not only in order to enable a reduction of the gauge.

A second objective is improvement of the aesthetics of the laminate, since the average consumer of plastic film and plastic bags mostly bases his judgement on very primitive strength testing and on the aesthetic impression, and generally prejudges a thin film as "cheap plastics" irrespective of its objectively established strength. A purpose of the present invention therefore is to improve the aesthetics by giving the crosslaminates of oriented films a textile-like look, notably by means which also have a technical function.

As regards the importance of visual effects in products made of plastics, reference is made to an article in Modern Plastics December 2002 pg. 50: "Visual Effects means Business", which states: "instead of considering an exterior simply as a cover for components, manufacturers are using it as a marketing tool to differentiate products and allow personalization".

A third objective of the invention is to enable a significant shrinkage by heat after the lamination, without thereby creating curling or irregular wrinkling (which crosslaminates normally tend to when shrinkage forces develop). Such shrinkage further enhances the tear propagation resistance and also enhances the puncture strength, since the shrunk crosslaminate has a certain memory of the state to which it was oriented before the stretching.

A key feature of the present invention is that the crosslaminated generally uniaxially oriented plies are supplied with a pattern of closely spaced "lines" of biaxially oriented, thinner material, under conditions which are specified as follows: a crosslaminate comprising at least two oriented plies A and B each consisting of thermoplastic polymer material, each biaxially oriented with one direction dominating and in which A is heat sealed to B through one or more lamination layers, whereby there has been established either a weak bonding all over, or a pattern of bonding alternating with no bonding, or of relatively strong bonding alternating with relatively weak bonding, and whereby A and B each comprises an array of linear bosses distributed over the film surface with a division no larger than about 2 mm, integrally connected by thinner linear webs (4), (9) which each by volume is less than 50% of the average of the two adjacent bosses, the delineation between a boss and an adjacent thin region being understood as the location where the ply thickness is the average between the thickest part of said boss and the thinnest part of said web, and whereby the main cross-sectional portion of each boss is uniaxially oriented sufficiently to achieve the dominating direction of orientation of A, while the thinner webs are biaxially oriented, characterised in that in even distribution over the area of the laminate at least 50% of the areas of the thinner linear webs in A and in B are unbonded or are weakly bonded such that the bond can be eliminated by repeated flexing and rubbing by hand and the majority of each boss to boss bond, is at least as strong as the strongest one of the immediate adjacent thin web to thin web bonds as determined by peeling at room temperature. These "lines" are in the following referred to as the "thinner webs", and the remaining parts of each ply are referred to as the "bosses". The pattern of bosses with intervening thinner webs is produced by segmental stretching in a direction which is transverse to the main orientation of the ply, preferably a stretching between grooved rollers, as specified in the claims. This embossed pattern is preferably made as fine as practically possible, and for that purpose an improved method and improved apparatus for grooved roller stretching has been invented. It is not new to provide one or both plies in a crosslaminate with a pattern of thinner webs, but it has been done under different conditions, namely in the manufacture of fluted (corrugated) crosslaminates, disclosed in WO02/102592 and WO 04/054793, as it shall be discussed later.

It is now found that the thinner webs, when they are unbonded or only weakly bonded to the adjacent ply, provide a surprising improvement of the tear propagation resistance. This can be explained by the influence of these biaxially oriented narrow "lines" on the ability for change of orientation in the ply under the tearing forces. Such change of orientation serves to stop the tearing, and the narrow "lines" act as initiators for the re-orientation. Therefore it is also important to provide a pattern as fine as practically possible.

As mentioned above, a second objective of the invention is improvement of the aesthetics, and this is achieved by a textile-like appearance of the crosslaminated embossed plies. One can say that each ply is "semi-fibrillated", and when the crosslaminate is superficially observed, it looks as if the plies really were fibrillated, especially when the visual effects are enhanced by incorporation of a pigment. Also with a view to the visual effects, it is important to make the pattern of bosses and webs as fine as practically possible.

The third objective of the invention mentioned above, namely a help to make a significant after-shrinkage of the laminate possible, is also achieved by virtue of the fine pattern of thin webs, since they so to say "absorb" the compressional forces which otherwise produce the creases or the tendency to curling. This is a very pronounced improvement.

BRIEF DESCRIPTION OF THE DRAWINGS

Further details of the invention appear from the accompanying drawings and the following description of the drawings.

FIGS. 5 and 6 are flowsheets representing two different routes of manufacturing the "semi-fibrillated" crosslaminate.

DETAILED DESCRIPTION OF THE INVENTION

Figure 1:
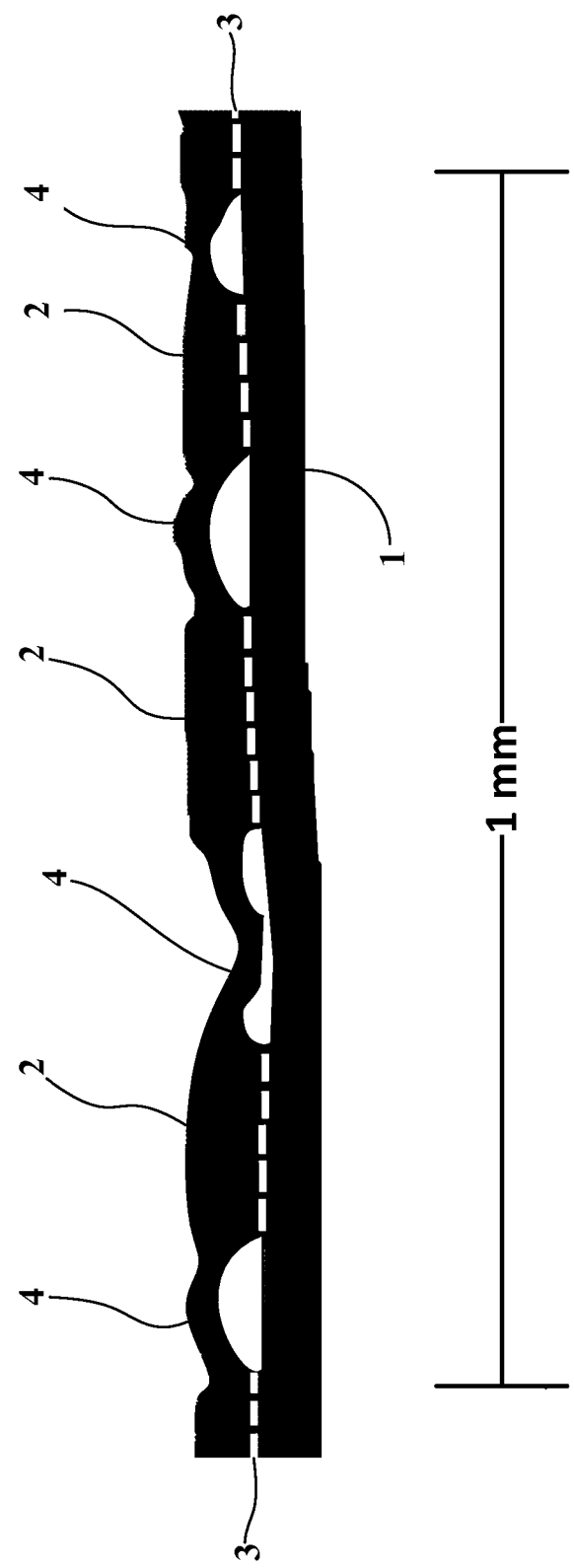
FIG. 1 is a retouched but true microphoto showing a section parallel with one of the main directions of the "semi-fibrillated" crosslaminate produced as explained in Example 1.

As background for the understanding of the invention a brief view over existing crosslamination technology may be useful. This mainly concerns the inventor's earlier publications.

The polymer materials for crosslaminates have been mainly and are mainly polyethylene and polypropylene of different types often modified by blending, and the old and present industrialization manufacturing processes comprise the steps of extruding a tube, which, by the draw-down, is oriented mainly in its longitudinal direction, helically cutting this tube to a web with its main direction of orientation on the bias, and continuously laminating two or more such webs with their main directions of orientation criss-crossing. There can also be included in the laminate a film which is oriented mainly in its longitudinal direction.

In the first commercialized technology based on these principles, the extruded tubular film, which is melt-oriented mainly in its longitudinal direction, is further cold stretched in this direction prior to the helical cutting. In a later commercialized technology, disclosed e.g. in U.S. Pat. No. 4,039,364, each tubular film is coextruded, having a layer which contributes mainly to the tensile strength in the laminate and at least one surface layer adapted to help in the bonding of the films, which at least partly takes place by pressure and heat.

Also special layers are coextruded on the films, which become exterior in the laminate. These special layers are adapted to modify the surface properties of the laminate, especially for improved heat sealing. In this later technology the helical cutting takes place in direct succession to the coextrusion without any cold stretching between, but in a separate production line. Further stretching is carried out when the films have been brought together in a sandwich arrangement, bonded or not yet bonded, to form a laminate. The films are biaxially stretched at a relatively low temperature. The transverse component of this biaxial stretching takes place between grooved rollers. In U.S. Pat. No. 5,028,289 and U.S. Pat. No. 5,626,944 this stretching between grooved rollers has been further developed.

Practical ways of carrying out the helical cutting are disclosed in U.S. Pat. No. 5,248,366. This patent also mentions an alternative cutting technique, namely that the tubular film can be provided with a helically extending melt orientation while it is drawn off from the coextrusion die, established by a relative rotation between the exit of the die and the drawdown means, and subsequently the cutting may be parallel with the axis or may be at an angle to the main direction of orientation. The process may even be adjusted to produce a web in which the main direction of the melt orientation will become perpendicular to the longitudinal direction of the web.

For the sake of completeness it should be mentioned that, in very early patents, there is also disclosed the possibility that longitudinally oriented polymer film material can be discontinuously crosslaminated and bonded in a press.

In a process which is entirely different from that described above, crosslaminates of a very stiff character are made for use in special advanced products. They consist of polymers which in molten or part-molten state are liquid crystals, and which become oriented and crosslaminated already within the extrusion die by means of counter-rotating die-parts. However, this type of process and product is not a subject of the present invention.

Reverting to the other types of crosslaminates, which more are commodities or technical products, the heat seal strength in a shear-type seal is adequate when a suitable lower melting polymer has been chosen for the surface layers of the laminate, while very special precautions must be taken if good shock-heat-seal strength is requested in peel-type heat seals, as usually needed for industrial bags supplied with such heat seals. These precautions are disclosed in U.S. Pat. No. 5,205,650 and WO-A-98/23434.

Recent inventions concerning crosslaminates comprise the inventor's five publications WO02/102592, WO04/54793, WO03/033241, WO04/094129 and WO05/102669. The first two supply one or both plies in a 2-ply crosslaminate with a waved structure like the waving in corrugated paper board, but generally with a wavelength which is shorter than normal for the paper board, generally with the waves extending in the direction of molecular orientation of the respective ply.

Both of these publications disclose and claim the formation of a pattern of thinner, biaxial webs. In WO02/102592 it concerns only one of the plies and is described throughout the specification from page 8 onwards and in the claims and in WO04/054793 it concerns one or both plies and is described throughout the specification from page 12 line 19 and in the claims. In both cases it concerns one set of thin linear biaxially oriented webs, which essentially for the bonded base of each flute, and further one set of narrower, thin linear biaxially oriented webs, each forming the crest of a flute.

It is noted that the tear propagation resistance of these corrugated crosslaminates is very high, and for such laminates improvements in this respect is not needed, however there are many fields of use in which fluted laminates are not applicable, such as uses in which fine print or a special pattern of embossment is required.

WO03/033241 and WO04/094129 concern in particular special attenuation and orientation processes in connection with the extrusion, by which the strength at elevated temperature, heat-seal properties, yield tension and/or barrier properties can be improved.

It would be natural to believe that the best way of manufacturing a crosslaminate would be to produce a transversely oriented ply by means of a tenter-frame, and laminate this with a longitudinally oriented ply, however the function of existing tenter-frames is limited to stretching at very elevated temperatures, e.g. 80° C. or higher, which at least in the case of HDPE or PP do not provide the ply with the properties which are adequate for crosslaminates. This is explained in detail in WO05/102669, which however claims a modified type of tenter-frame suitable for stretching at much lower temperatures. This known art has direct importance for some embodiments of the present invention and will be described in connection with these embodiments.

The product according to the present invention comprising at least two oriented plies A and B each consisting of thermoplastic polymer material, each biaxially oriented with one direction dominating and in which A is heat sealed to B through one or more lamination layers, whereby there has been established either a weak bonding all over, or a pattern of bonding alternating with no bonding, or of relatively strong bonding alternating with relatively weak bonding, and whereby A and B each comprises an array of linear bosses distributed over the film surface with a division no larger than about 2 mm, integrally connected by thinner linear webs (4), (9) which each by volume is less than 50% of the average of the two adjacent bosses, the delineation between a boss and an adjacent thin region being understood as the location where the ply thickness is the average between the thickest part of said boss and the thinnest part of said web, and whereby the main cross-sectional portion of each boss is uniaxially oriented sufficiently to achieve the dominating direction of orientation of A, while the thinner webs are biaxially oriented, characterised in that in even distribution over the area of the laminate at least 50% of the areas of the thinner linear webs in A and in B are unbonded or are weakly bonded such that the bond can be eliminated by repeated flexing and rubbing by hand and the majority of each boss to boss bond, is at least as strong as the strongest one of the immediate adjacent thin web to thin web bonds as determined by peeling at room temperature. The method of manufacturing the product of the present invention comprising at least two oriented plies A and B each consisting of thermoplastic polymer material, in which method each of the plies is biaxially oriented in several steps with one direction dominating and in which A is heatsealed to B through a lamination layer, whereby there is formed either a weak bonding all over, or a pattern of bonding alternating with no bonding, or of relatively strong bonding alternating with relatively weak bonding, and whereby A and B each is segmentally stretched to form an array of linear bosses distributed over the film surface with a division no larger than about 2 mm, integrally connected by thinner linear webs which each by volume is less than 50% of the average of the two adjacent bosses, and which after termination of the stretching operations have acquired biaxial orientation, the delineation between a boss and an adjacent thin region being understood as the location where by the ply thickness is the average between the thickest part of said boss and the thinnest part of said web, and in which method the main cross-sectional portion of each boss becomes uniaxially oriented sufficiently to achieve the dominating direction of orientation of $A_5$ characterised in that evenly distributed over the area of the laminate at least 50% of the areas of the thinner linear webs in A and in B are such that the bond can be eliminated by repeated flexing and rubbing by hand and the majority of each boss to boss bond, is at least as strong as the strongest one of the immediate adjacent thin web to thin web bonds as determined by peeling at room temperature. When the stated conditions of the bonding between ply A and ply B are fulfilled the thinner, biaxially oriented webs or "lines" have a surprising influence on the tear propagation resistance. In this case a sufficient part of these "lines" have a sufficient "freedom" to act as initiators for the tear-inhibiting reorientation processes, which have been mentioned above, and the flexibility, which they provide after local delamination at the location where the tear propagates, also has tear inhibiting effect. Reference is made to the comparative testing in Examples 2 and 3.

As it has been mentioned above, the two publications WO02/102592 and WO04/054793, both dealing with crosslaminates which are fluted like corrugated paper boards, also disclose the formation of thinner, biaxially oriented webs or "lines", but in these disclosures the majority of the web area is stronger bonded to the adjacent ply that the bonds boss to boss. In fact the bosses are mostly unbonded. The purposes of the thin webs in these products are to facilitate the formation of the flutes and enhance the stiffness of the flutes. These known corrugated crosslaminates also show a very good tear propagation resistance, however this is due to the corrugated form and not to the effects which the thin webs exert in the present invention.

The "slack" effect of the flutes in the above mentioned corrugated crosslaminate helps to minimize the concentration of forces in the tear propagation locations ("the notch effect").

In the present invention some "slack effect" is also preferable as long as it does not interfere with the needs especially for printability or receptability for embossed patterns. Practical limits in this connection are characterized in that the laminate comprises unbonded regions which form slacks, the slack extent is limited such that viewed in a section perpendicular to the extension of the bosses and the webs, the width of the slack measured along the actual film surface, is at the highest 0.5 mm, preferably at the highest 0.3 mm and more preferably at the highest 0.2 mm larger than the direct distance between the boundaries of the slacks.

As mentioned above in describing the basic product and method for making the product, the plies A and B are heat-sealed together through one or more lamination layers. This can be by extrusion lamination or through coextruded lamination layers. The term "heat-sealed" includes the possibility that the plies are ultrasonically sealed together, since such sealing in effect is due to a local heating caused by the ultrasonics.

The test for weak bonding indicated in the basic product as described above, namely repeated flexing and rubbing by hand, is a practical test which probably is known by all who deal with film laminates, mostly as a quick test for rejecting insufficient bonding. "No bonding" and "eliminated bonding" can be exactly detected by studying the cross-section under a microscope. The pattern of bosses and intervening webs will appear generally even when different microtome cut specimens are compared, cut out perpendicularly to the bosses, following a chosen group of bosses. The pattern of bosses and thinner webs will often be overlapped by a bonding pattern determined, for instance, by corrugations on the laminating rollers, as explained in connection with FIG. 3, but by examining a sufficient number of microtome-cut strips of the laminate it can be detected how high a percentage of the total area of the thin webs is unbonded or weakly bonded (as defined).

The peel strength of bonds that are stronger than the weakest bonding can be determined, if any doubt arises, by peeling of sufficiently narrow strips cut out, for instance, with a microtome.

The average thickness of each said thinner web preferably is no larger than 80%, more preferably generally between 25-50% of the maximum thickness of the adjacent bosses. Furthermore, preferably the width of the bosses is generally no more than about 1 mm, more preferably no more than generally about 0.5 mm, but most preferably generally in the region about 0.05-0.2 mm. Finally, the width of each thinner web preferably is at least about 50% of the maximum width of the two adjacent bosses, and more preferably it is no less than 25% of the average width of the two adjacent bosses.

It is mentioned above that an important function of the thinner, biaxially oriented webs or "lines" is to act as initiation sites for reorientation of the plies during the tear propagation. Accordingly, the degree of uniaxial orientation in the bosses and the temperatures at which this has been established are preferably limited to such an extent that during slow tear propagation each of the plies A and B reorients instead of fibrillating in the locations where the tear propagates. However, even if fibrillating instead of reorientation happens to take place due to too high a stretch ratio in the bosses or too high a temperature for this stretching, the effect that the biaxially oriented webs make the location of tear propagation more flexible, still helps to increase the resistance to tear propagation.

As it will be understood from the above, a weak bonding all over may be sufficient for relatively heavy crosslaminates or for bags in general, however in most cases a pattern of bonding alternating with no bonding or of relatively strong bonding alternating with weak bonding is preferable. While the basic product and method for making the product as described above indicate that "weak" refers to the possibility to eliminate the bonding by repeated flexing and rubbing, it is not possible to make indications in form of values of the peel force, since this varies with the gauge, stretching ratios, raw materials and the applications.

However, as already mentioned, the broad principle of such bonding patterns is state of the art, and furthermore the choice of bonding forces is a matter of routine experimentation from case to case.

Figure 2:
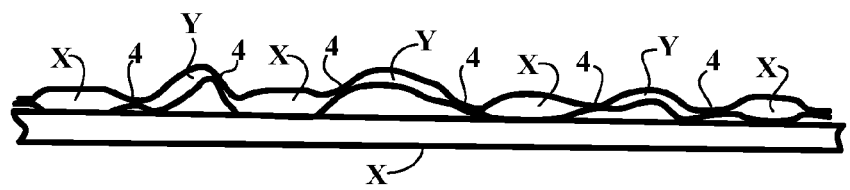
FIG. 2 is a drawing, showing in similar section as FIG. 1 a "semi-fibrillated" (i.e. segmentally stretched) crosslaminate comprising two categories of bosses, namely the thicker bosses X which are bonded and the unbonded thinner bosses Y.

The bonding which is defined in the characterizing part of the basic product and method for making the product as described above can be established in principally different patterns. In one embodiment, the crosslaminate product is characterized in that the bonding is confined to the bosses alone, or the bonding boss to boss is stronger than the bonding between adjacent thinner webs. In another embodiment, the crosslaminate product is characterised in that the bonding system is confined to regions which each comprise several bosses and thinner webs, while the remainder of the area of the laminate is unbonded. In another embodiment, the crosslaminate product is characterized in that the thinner webs are unbonded all over, and the bosses are bonded all over, but this boss to boss bond is stronger within regions which each comprise several bosses and several thinner webs, than the strength of the bonding boss to boss outside these regions. In another embodiment, the crosslaminate product is characterized in that there are two series of bosses X and Y where the bosses X are thicker than the bosses Y, whereby each thinner web (4) is adjacent to one boss X and one boss Y, and that either the bonding is confined to the bosses X alone, or the bonding of boss X to boss X is stronger than the bonding of boss Y to boss Y. The structure according to the last embodiment set forth immediately above is illustrated by FIG. 2 and explained in connection with this drawing, while the other aspects of the bonding systems according to these embodiments are explained in connection with FIG. 3.

It is noted that the bonding systems which leave thinner webs unbonded, normally will exhibit a higher tear propagation resistance, compared to systems which are equal to this in all respects, except that the thinner webs are weakly bonded. However, there is a draw back in the no-bonding system, namely that air can get access to the plies from the inside through the channels formed by the thin webs, and thereby the laminate becomes more susceptible to UV degradation, if the use of the laminate is such that it comes under influence of strong sunlight for a long period of time.

The main product and process of this invention (as described above) do not state at which step of the manufacture each of the plies A and B have been embossed by segmental stretching (normally grooved roller stretching) to form the patter of bosses and thinner webs. In one embodiment, the method is characterized in that prior to the lamination ply A is longitudinally stretched all over in generally uniaxial manner, while ply B is transversely stretched all over in generally uniaxial manner and ply A is transversely stretched in segmental manner preferably between intermeshing grooved rollers having circular grooves or having helical grooves of a low pitch compared to the radius of the rollers, while ply B is longitudinally stretched in segmental manner preferably between intermeshing grooved rollers, having grooves which extend axially or slightly helically, said segmental stretching of A and B being carried out either prior or subsequently to the all over stretching of the ply, or between two steps of the all over stretching of the ply, and optionally ply A and/or ply B are thermally stabilized prior to their lamination. In another embodiment, the method is characterized in that prior to the lamination, each of plies A and B is longitudinally stretched all over in general uniaxial manner while it is in tubular form or lay-flat tubular form, and the ply while in lay-flat tubular form is transversely stretched in segmental manner preferably between intermeshing grooved rollers having circular grooves or having helical grooves of a low pitch compared to the radius of the rollers, said segmental stretching being carried out either prior or subsequently to the all over stretching, or between two steps of the all over stretching, and optionally ply A and/or ply B is/are thermally stabilized after termination of the stretching steps, and subsequently each of the plies A and B is helically cut to form a web having its main direction of orientation at an angle to its longitudinal direction, and finally the lamination of A and B is carried out continuously with the main directions of orientation of A and B arranged at an angle to each other. However, this segmental stretching is preferably carried out either prior or subsequently to the all over stretching of the ply, or between two steps of the all over stretching of the ply. These two embodiment concern different routes of manufacturing the cross-laminate. In one route illustrated by the flow sheet FIG. 5, the starting film is a lay-flat tubular film, the dominating direction of orientation is the longitudinal direction of the tube, and the segmental stretching takes place transversely, i.e. normally by means of grooved rollers having circular grooves or helical grooves of a pitch which is very small compared to the radius of the rollers. Subsequently the two plies are cut on the bias and are continuously crosslaminated.

The apparatus for carrying out this transverse stretching is believed to be new and forms another aspect of the present invention and comprises a pair of intermeshing grooved stretching rollers having circular or helical grooves to stretch the material in a direction generally transverse to the machine direction; and characterized in that each crest on the grooved surface of at least one of the grooved stretching rollers has two edges, each of which is sharp, over which the ply is stretched. In one preferred embodiment, the apparatus is characterized in that the crests of both intermeshing grooved stretching rollers have two sharp edges. In another preferred embodiment, the apparatus is characterized in that the two edges protrude. In another preferred embodiment, the apparatus is characterized in that the stretching rollers are heated, preferably to a surface temperature of about 60 to 80° C. In another preferred embodiment, the apparatus is characterized in that the pitch of the grooved stretching rollers is in the range 0.8 to 1.2 mm, and in which the distance between the two edges on a crest is in the range 0.3 to 0 5 mm. In another preferred embodiment, the apparatus also comprises a second pair of intermeshing grooved transverse stretching rollers, at each crest of which a single stretching zone is created, having under operational conditions identical pitch to the grooves of the first pair of grooved stretching rollers and being in registration with the first pair of grooved stretching rollers such that the stretched zones on the ply passed between the second pair of grooved stretching rollers falls between or joins the stretched zones formed by passing the ply between the first pair of grooved rollers. In another preferred embodiment, the apparatus is characterized in that each roller is at least 1 m long preferably up to 3 m long, and preferably in which each grooved roller is formed from coaxially mounted sub-rollers. In another preferred embodiment, the apparatus is characterized in that the sharp edges have been treated by a process involving an electrolytic polishing step. In another preferred embodiment, the apparatus is characterized in that the sharp edges have a radius of curvature in the range 20 to 50 μm. Laminating apparatus including the transverse stretching device may comprise means for carrying out the other steps of the method of this invention as set forth herein and as claimed in the attached claims.

In the other route, illustrated by the flow sheet FIG. 6, the dominating direction of the orientation of one ply is transverse to the machine direction, and the segmental stretching is parallel or almost parallel to the machine direction, i.e. if carried out, as normally preferred, by means of grooved rollers, the latter must have grooves extending axially or helically, in the latter case almost parallel to the axial direction. The second ply is stretched similarly to the stretching which is carried out in the first mentioned route.

The second route presents the advantage that all process steps can take place in-line, as shown in the flow sheet, but the machinery is much more expensive than the machinery for the first route due to the need for a tenter-frame. This tenter-frame is preferably of the type described in WO05/102669 in which the ply is brought into a pleated state with the pleats extending transversely, to allow a longitudinal contraction during the transverse stretching. This tenterframe process is characterized in that the orientation process at each position of the passage essentially is limited to one or two narrow neck-zones each controlled by long, narrow heating means which, seen in the transverse dimension of the apparatus, each act over a narrow space and over which the film is passed in frictionless or low-friction engagement, and has its longitudinal direction angularly disposed to the film travel in such way that in each film cross-section the narrow neck-zone or zones gradually proceeds over the width of the film until essentially the entire width to become oriented has passed such zone or zones.

In the two flow sheets, the segmental stretchings (grooved roller stretchings) are indicated as taking place subsequently to the other stretching step or steps. However, it could also be at an earlier stage of the manufacturing process. The carrying out of the segmental stretching after finalization of the other stretching or at a late stage of the latter can give the orientation of the webs the most biaxial character and provide the most effectual tear-inhibiting effect, while segmental stretching at an earlier stage, especially prior to any other stretching in solid state, can lead to a finer pitch of the embossed pattern and thereby improved aesthetics.

This is under the condition that the ply is allowed an almost free contraction perpendicularly to the direction of stretching. For tenter-frame stretching this can be achieved by the pleating mentioned above, and for longitudinal stretching this can also be achieved by pleating prior to the stretching, the latter taking place between closely spaced rollers, as disclosed in the inventor's old U.S. Pat. No. 3,233,029. Furthermore segmental stretching as an early step of the orientation process followed by the stretching in pleated state, promotes the tendency to give the thinner webs a slack form. This shall be explained later.

In the carrying out of the segmental stretching, normally under use of grooved rollers, the pitch of the produced segments of stretching should preferably be almost as fine as possible, and for this purpose an improved stretching method and apparatus for this has been invented. This method concerns in general longitudinally stretching of a film consisting of thermoplastic polymer material in generally uniaxial manner below its melting range in one or more steps, and prior or subsequently to this stretching or between two of such steps transversely and segmentally stretching the film between intermeshing grooved rollers having circular grooves or helical grooves of a low pitch compared to the radius of the rollers. The method is characterised in that each crest on the grooved surfaces of the rollers has two edges which each is sufficiently sharp for producing the said thinner linear web in the ply. To achieve this best possible, the said two edges preferably protrude to limit the contact between the ply and the grooved rollers to the edge portions of the crests. In other words, the crests on the grooved rollers should preferably have concave shape, see FIG. 8.

In this connection it is furthermore preferable that the grooved rollers are heated, e.g. to about 60-80° C., while the web is introduced to the rollers at a lower temperature, e.g. about 20-45° C. to selectively heat the ply on the edge portions of the grooved roller crests. The heating helps to provide control over the thickness of the webs. This embodiment is further explained in connection with FIG. 9.

In any case, the pitch of the grooved rollers should preferably be between about 0.8-1.2 mm, and the distance from one to the other of said two edges on the crest should preferably be between about 0.3-0.5 mm.

Figure 10:
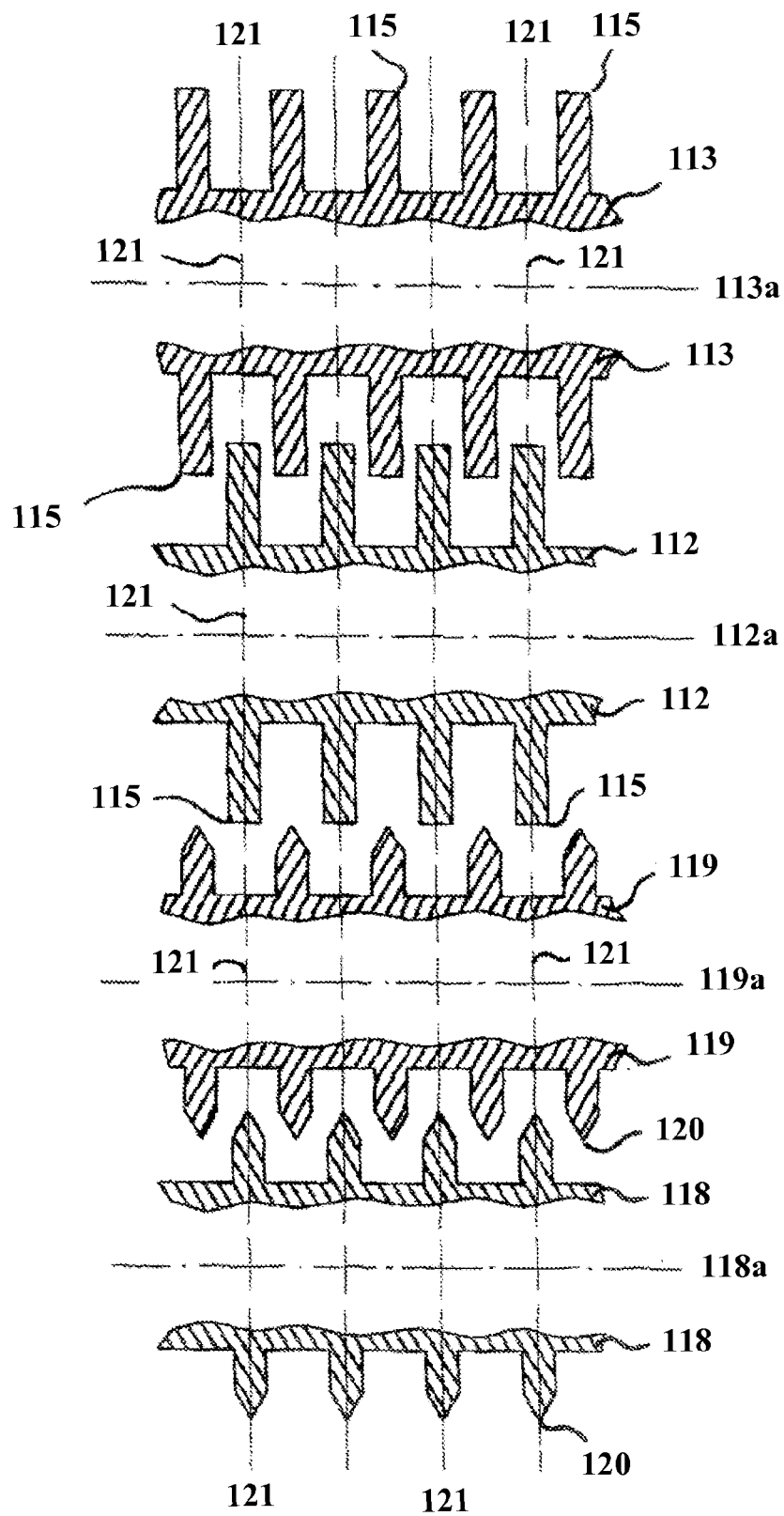
FIG. 10 shows another preferred set-up and operation of the grooved rollers represented by FIGS. 7 and 8, namely in "registration" with a set of grooved rollers, which makes one thin web on each crown of the grooved surfaces.

In order to achieve the maximum of fineness in the pitch of the embossed pattern on the film, several segmental stretching processes can be carried out in register with each other, in particular (as illustrated in FIG. 10) when the segmental stretching is a transverse stretching between circular grooved rollers (in this connection referred to as the first grooved rollers). This embodiment of the stretching method is characterised in that, prior or subsequently to the segmental stretching between the first grooved rollers, the ply is subjected to a second segmental stretching between second circular grooved rollers, said second grooved rollers a) producing only one stretching zone on each crest,
b) having under the operational conditions exactly the same pitch as the first grooved rollers, and
c) being in exact registration with the first grooved rollers such that each stretching zone formed by the second grooved rollers falls between or joins with the two stretching zones formed on the edges of one crest of the first grooved rollers.

For industrial production the roller lengths must normally be at least about or more than 1 m, and 2-3 m length may also be required. Therefore the machining of the roller surfaces requires an extreme accuracy, and each roller must be composed of segments mounted on a core. The description of the roller drawings deals in further detail with the achievement of the accuracy and with a correct degree of sharpness on the edges of the crests on the grooved roller surfaces.

It is emphasised emphasized that the above mentioned segmental stretching methods in which at least a part of the segments are produced on the edges of flat or concave crests of grooved rollers, are not limited to the manufacture of the product as described above. These methods can e.g. also with advantage be used in the manufacture of the fluted crosslaminates dealt with in the above mentioned WO02/102592 and WO04/054793, since the pitch of the fluting can be finer by application of the described measures. Furthermore, the biaxially oriented film produced by these methods can in many cases be used as a single ply without any lamination process, e.g. as a packaging film for wrapping or for sanitary purposes, especially when the average gauge of such film is about 0.05 mm or lower.

Going back to the main aspect of the invention, the two plies A and B may have a straight extension, as it appears from the foregoing or one or both may comprise slacks, but preferably the over-length of the slacks should be limited in that the crosslaminate product is characterized in that the laminate comprises unbonded regions which form slacks, the slack extent is limited such that viewed in a section perpendicular to the extension of the bosses and the webs, the width of the slack measured along the actual film surface, is at the highest 0.5 mm, preferably at the highest 0.3 mm and more preferably at the highest 0.2 mm larger than the direct distance between the boundaries of the slacks. Two different types of slacks are illustrated by the microphoto FIG. 1 and by the drawing FIG. 2. Such slacks are quite different from the flutes disclosed in the above mentioned WO02/102592 and WO04/054793. They have a positive influence on the resistance to tear propagation since they distribute the tearing forces around the location where the tear propagates, thereby reducing the notch effect. Furthermore they help to give the crosslaminate a textile-like look and/or feel and may remove gloss, if desired. Alternatively, there may be a need, e.g. for printing purposes or for subsequent decorative or functional embossment—to make the crosslaminate without any such slacks.

The slacks are formed by shrinkage of the laminate during the lamination process or during an after-shrinkage process at elevated temperature. When ply A shrinks, the bosses in ply B will be brought closer together, leading to slack formation in the webs of B unless these webs can shrink similarly in the same direction. Similar effects happen to the webs in ply A when ply B shrinks. As mentioned above the formation of slacks is promoted by carrying out the segmental stretching as an early step of the orientation processes, followed by the stretching in pleated state. The explanation is that, since this stretching gives the ply on its whole a possibility for contraction transverse to the direction in which the stretching takes place, it reduces the biaxial character of the orientation in the thinner webs, which means that they are stabilized against further contraction in the same direction.

Another measure for stabilizing the thinner webs, and thereby promote slack formation during lamination or in an after-shrinkage process, is to selectively heat treat the thin webs with hot air while the bosses are kept at a lower temperature by contact with a cooled surface, normally a roller surface. The selective heating is possible since there will be some air-space between the web and the cooled surface. This heat treatment may even be carried out to such an extent that the thinner webs partly melt.

As mentioned there are cases in which slacks are not wanted. If they are formed accidentally during the lamination or during an after-shrinkage process, they may be removed, first on one side, then on the other side of the laminate, by heating the slacks with hot air while contacting the bosses with a cooled surface, normally a cooled roller surface. The conditions of the heating must be carefully adjusted since in this case some parts of the bosses will be heat insulated from the cooled surface.

Very suitable materials as main component in the crosslaminate due to strength properties, stiffness and relatively low price—are HDPE or crystalline PP of high or medium high molecular weight.

With a view to the possibilities for reorientation during tearing it is advantageous to carry out stretching in the dominating direction of orientation at a temperature around or below 50° C., at least when the polymer material is based on PP or HDPE. A subsequent heat treatment, e.g. at about 80-90° C. may then be needed in order to avoid shrinkage at a wrong stage of the manufacturing process.

The orientation of the plies is preferably carried out to such an extent that the ultimate tensile strength of the crosslaminate, at least in one direction but normally in all directions, becomes no less than about 25 MPa, more preferably no less than about 40 MPa. In the determination of this strength, which is expressed as a force per area cross section, the thickness must be understood as average thickness in compacted state. In practice this is calculated from the square meter weight, when the density of the constituents in the film are known.

The bonding layer is preferably selected as a blend of two or more compatible polymers of significantly different melting ranges, such that the lower melting of said blended polymers starts to melt at a temperature at which there will be minimal disturbance or the orientation produced in the main portions of each ply. The blending ratio and the lamination temperature should be selected to produce the desired balance between resistance to delamination and tear propagation resistance. For instance, in the case of HDPE based crosslaminates the lamination layer or layers can with advantage consist of a blend of LLDPE and metallocene LLDPE or LLDPE and EVA.

With a view e.g. to the aesthetic effect, the plies A and/or B are preferably microvoided. As it is well known this can be achieved by admixture of a suitable powder (e.g. talc) and/or by the choice of conditions for the stretching steps. As it also is known, HDPE and PP form microvoids without any admixture of powder if the orientation is carried out at a temperature around or below 50° C. As mentioned above it is also found advantageous for the strength properties of the crosslaminate based on HDPE or PP that the majority of the orientation is carried out at such relatively low temperatures. However, more important than the aesthetic effect is the possibility to make a breathable crosslaminate by adjusting the conditions of the stretching steps and/or the choice of admixed powder such that the voids in the thinner webs become continuous through the webs. Microporous thin breathable films are normally laminated with fabrics to give them sufficient strength, but in this aspect of the invention the reinforcement, namely the uniaxially oriented bosses, are integral with the microporous thin film material. Such breathable crosslaminates according to the invention can in heavier gauges, e.g. in average gauge about 0.05-0.15 mm, be used for "house-wrapfilm", roof underlay, breathable bags and rain coats, and in lower gauges, e.g. about 0.01-0.03 mm, for miscellaneous medical and sanitary purposes.

Alternatively the laminate according to the invention may be microperforated.

DETAILED DESCRIPTION OF THE DRAWINGS OF THE INVENTION

In FIG. 1, boss (1) is formed in a first one of the two "semi-fibrillated" plies. Bosses 2 are formed in a second "semi-fibrillated" ply, and the interrupted line (3) indicates the interphase between the two plies. It should be understood that the first ply, when viewed in a section perpendicular to the boss (1), looks generally as the second ply does in this microphoto. All bosses are relatively strongly oriented in their longitudinal direction. As it appears from the example, each ply is a coextruded, 3-layered film consisting of HDPE in its middle, LLDPE on the surface which also forms a surface of the laminate, a blend of metallocene LLDPE and normal LLDPE forming a bonding layer. However the microphoto does not show that the two films are 3-layered, nor does it show the bonding phase indicated by the interrupted line (3). Three of the four regions (4) shown in the microphoto form slacks or loops, and as it has been described above and claimed this feature has an important positive influence on the tear propagation resistance of the crosslaminate. However, if desired the slack effect can be eliminated by selective heating of the thinner webs.

In the drawing FIG. 2, the unbonded spaces are made wider. This conveniently can be done by overstretching of the thinner webs. This widening has been established by means of the bosses Y, which are thicker than the webs (4), but thinner than the bosses X. Each web (4) is adjacent to one boss X and one boss Y. The linear pattern of different thicknesses can be established as explained in connection with FIG. 10, and the bonding of generally all bosses X in ply A to bosses X in ply B while maintaining the rest of the area of the laminate essentially unbonded, can be achieved by a suitable choice of hardness on the surface of the laminating rollers and a suitable roller pressure. The webs (4) and bosses Y are shown in a slack state, but can be straightened out by heat treatment.

Figure 3:
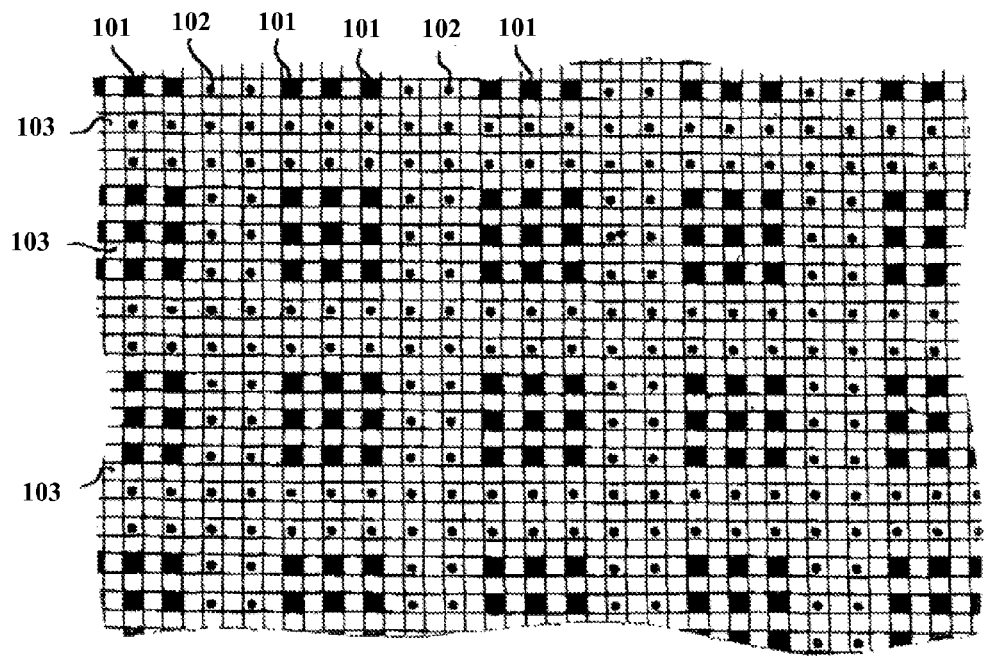
FIG. 3 is a schematic representation of advantageous bonding/no bonding or strong bonding/weak bonding or strong bonding/weak bonding/no bonding patterns.

In the schematic representation of advantageous bonding systems, FIG. 3, the vertical lines show delineations between bosses/thinner webs in ply A, and the horizontal lines show similar delineations in ply B. The lines need not follow the machine/transverse directions of the crosslaminate, but could e.g. be under an angle of 45° to these directions. Furthermore, the webs and bosses in ply A need not extend perpendicularly to the webs and bosses in ply B as here shown. On the contrary, the best tear propagation resistance in all directions is usually found when the two directions of the embossed pattern, and thereby the main directions of orientation in A and B, form an angle of about 55-65° with each other. The perpendicular arrangement of the two arrays in the pattern is here chosen for the sake of simplification. The boss to boss intersections comprise the solid squares (101) and the squares (102) marked with a dot. The rest of the squares represent either web to web or web to boss arrangements as described below.

Bonding System 1:

Bonding in the squares (101) and (102), no bonding over the rest of the squares, achieved by adjustment of the surface hardness of the laminating rollers and the roller pressure. Established in Example 1 (see FIG. 1) and Example 2.

Bonding System 2:

Bonding in the squares (101) and (102), also bonding but a weaker bonding over the rest of the squares, achieved by adjustment of the surface hardness of the laminating rollers and the roller pressure. Established in Example 4.

Bonding System 3:

Bonding in the squares (101) and no bonding over the rest of the squares, as in Example 3, achieved either by a suitable embossed pattern on one or both lamination rollers, so as to bring plies A and B under heat and pressure in bosses which each comprise several cross-points between the bosses, or by coextruding the lamination layer on ply A and ply B in form of an array of closely spaced narrow strips as disclosed in WO03/074264.

Bonding System 4:

Relatively strong bonding in the squares (101), weaker bonding in the squares (102) and similar bonding or no bonding over the rest of the squares. This is preferably also achieved by the above mentioned coextrusion method disclosed in WO03/074264, but in this case the coextruded film must comprise (as also disclosed in the said publication) two lamination layers, one strongly bonded which is in the form of narrow strips, and one weaker bonding, continuous lamination layer between the strips and the main layer of the coextruded film.

Bonding System 5:

Bonding only the squares (101) and in squares directly adjacent to these squares as in Example 5. This is achieved in a similar way as bonding system 3, but the hardness of the lamination roller surfaces and/or the roller pressure is adapted also to bond the thin webs adjacent to squares (101).

In this principal sketch there are only shown 9 of the cross-points (101) within each group of bonding or strongbonding. However, since the width of each boss on the plies A and B most preferably is about 0.05-0.2 mm, and the linear dimensions of each of these groups preferably is, as a rough indication about 1 to 5 mm, it is clear that the number of cross-points (10) within each group is much higher than shown. There may e.g. be about 500 or more of such crosspoints within each group.

Figure 4:
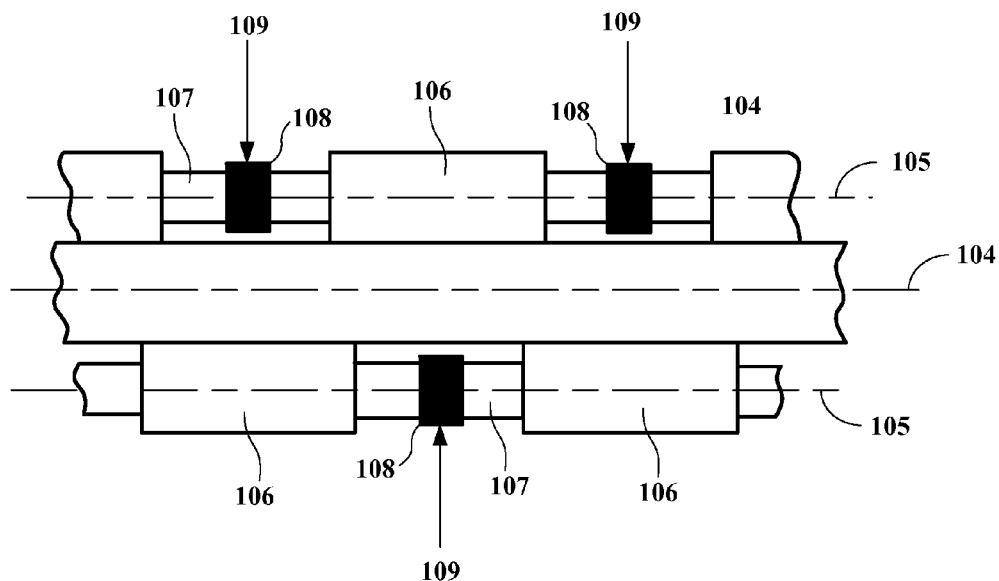
FIG. 4 shows a set of rollers suited for laminating very thin plies while bonding boss to boss but keeping the thinner webs unbonded.

As it appears from the foregoing the selection of surface hardness on the lamination rollers and pressure between the rollers will in many cases be critical, especially if the thickness of the plies is very low, e.g. about 0.01 mm, and if at the same time all of the thinner webs should be kept free of bonding. In such cases it may even be necessary to laminate with steel surfaces on both rollers. In this and other cases, the application of an even roller pressure over the full width of the plies, which normally will be more than 1 m, is also a problem which must be solved. FIG. 4 shows a practical solution to this. One central roller (104) is used, and on opposite sides of this are located two rollers (105), which consist of segments (106) connected through shafts (107). On each shaft there is a bearing (108), which is biased towards the central roller (104), e.g. by pneumatic or hydraulic means, here indicated by the arrows (109). Means for circulating hot water or oil (not shown) may also be provided.

Figure 7:
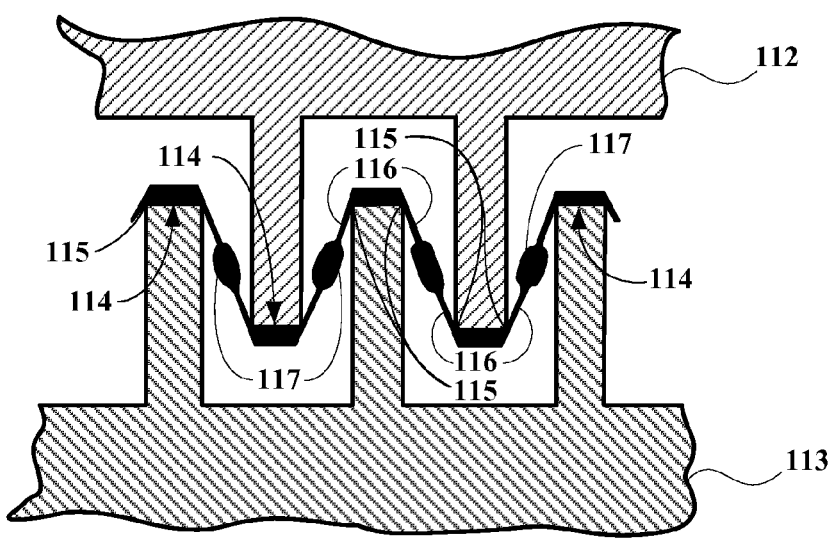

The processes according to the flow sheets FIGS. 5 and 6 have already been explained in the general description. With reference to FIG. 7, the mutually intermeshing grooved rollers (112) and (113) which effect the segmental transverse stretching have flat crests (114) on their circular teeth (flat seen in cross-section) with relatively sharp edges (115). The segmental stretching starts on these edges (115) and develops into thin continuous webs (116) and continuous bosses (117). The intermeshing is limited such that there are maintained thicker material, bosses (117), on the flat crests (114) of the circular teeth.

The requirements for precision in the manufacture of the roller surfaces is high, and it is highly advisable to make the outer part of rollers from short segments. The radius of curvature on the "sharp edges" is of importance. It depends on the properties of the coextruded film, but should normally be within a range of about 20-50 micrometer. A suitable industrial method of making a relatively exact adjustment of this curvature is first to make the edges really sharp, then round them by electrolytic polishing, and finally carry out electrolytic Cr-plating. These electrolytic processes must of course take place under precisely established conditions.

In FIG. 7 the width of the thinner webs is shown to be about equal to the width of the bosses. Normally, but not always, it is preferred that the thinner webs in the final product should be narrower than the bosses to give the product good stability. However, in FIG. 7 shows the cross-section of the laid-flat tubular film while it is tentered, and the width of the thin regions will be reduced when it leaves the grooved rollers.

Figure 8:
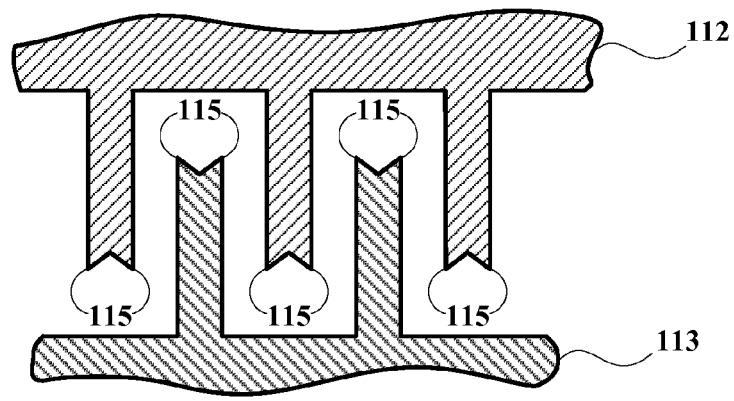
FIGS. 7 and 8 each show a detail of two intermeshing grooved rollers in the process of segmental stretching of a film material, making two thin webs on each crown of the grooved surfaces. The grooves may be circular or helical but almost circular. The indicated ranges of measures are generally indicated below.

The purpose of making relatively sharp edges on the circular teeth of the grooved rollers is to make the pattern of embossment particularly fine. The precision of this embossment is enhanced by the profile of the teeth which is shown in FIG. 8. Here the crests are not flat, seen in cross-section, but have a concave shape, so that the edges protrude radially beyond the part of the crest between the edges (115).

Figure 9:
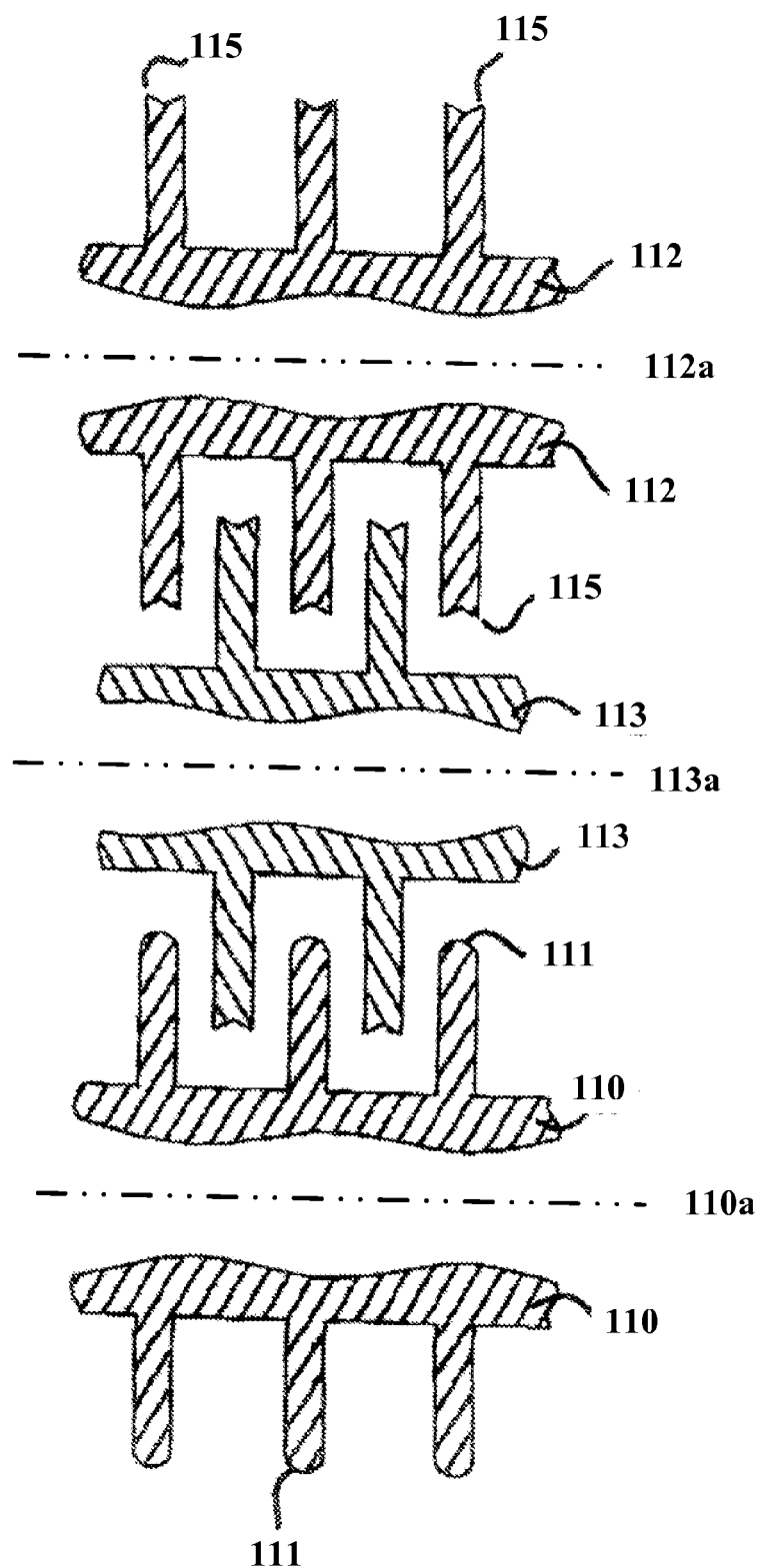
FIG. 9 shows a preferred set-up and operation of the grooved rollers represented by FIG. 8 when the rollers are heated.

In FIG. 9, it should be understood that the two grooved rollers (112) and (113), which are similar to the two rollers in FIG. 9, are heated such that the formation of the thinner webs on the protruding edges (115) is facilitated and their thickness can be better controlled. There is added a third grooved roller (110) with smooth, rounded crests (111). The three grooved rollers (112), (113) and (110) are shown in a compact form, that is only two diametrically opposite segments of each roller, and their center lines (112*a*), (113*a*) and (110*a*) are shown.

While rollers (112) and (113) are heated, e.g. to 70-90° C., roller (110) is kept at a much lower temperature, e.g. at around 20° C. Under operational conditions the three grooved rollers must have exactly the same pitch, i.e. at room temperature rollers (112) and (113) will have a pitch which is smaller than the pitch on roller (110). This roller set-up operates as follows:

The ply follows roller (112) over a distance sufficient to heat the ply-part in contact with the warm protruding edges (115) to the temperature, which has been chosen for the segmental stretching. This takes place when the grooved surface on roller (112) intermeshes with the grooved surface on roller (113). At this point the ply portions which come in contact with the protruding crown edges on roller (113) will not be stretched since they have not yet been heated, or will be stretched only to a low degree. These ply portions heat up while they follow roller (113), and become stretched when the crests on roller (113) intermesh with the cold, smooth crests on roller (110). The intermeshing between rollers (112) and (113) and between rollers (113) and (110) should be adjusted to make the widths of all webs as equal as possible.

In FIG. 10, the two "registered" sets of grooved rollers are shown in a similar compact drawing as the three rollers in FIG. 9. Rollers (112) and (113) are similar to the two rollers in FIG. 8, while roller (119) has only one relatively sharp edge on the crest of each circular tooth, namely (120) in the middle of the tooth. The teeth on rollers (118) and (119) are mutually intermeshing, each making one stretching zone (thin web) and the two pairs of grooved rollers are in "registration" such that the middle of each tooth on roller (119) almost touches the middle of a tooth on roller (112). In FIG. 8b the registration is indicated by the broken lines (121). Means for securing exact registration between grooved rollers in the manufacture of the latter are known from WO-A-02-102592. As a result of this registered transverse stretching the film will have formed two bosses (122) corresponding to each crest of rollers (112) and (113), and thereby a still finer pattern of embossment is achieved.

Rollers (112) and (113) can be installed downstream of rollers (118) and (119), or vice versa, namely that the former are installed upstream of the latter. It depends on the properties of the extruded, meltoriented film which one of the two options is chosen.

However, if the tips (120) of the crests on rollers (118) and (119) are made smoothly rounded, this set-up of grooved rollers can be used to manufacture the structure shown in FIG. 2. The relatively thin bosses Y are formed on the rounded tips (120).

EXPERIMENTS OF THE INVENTION

Example 1

A 60 micrometer thick 3-layer tubular film is extruded, composed as follows:
Middle layer, 80% of total: HDPE of m.f.i.=0.2 and density–0.944 g ml$^{-1}$.
Outer surface layer—lamination layer, 10% of total: 50% Affinity 8770 (a metalocene of m.f.i.=1.0.
Inner surface layer, 10% of total: LLDPE of m.f.i.=1
Blow ratio: 1:1:1.
Longitudinal drawn down ratio: 30:1.

The tubular, uniaxially meltoriented film is semi-fibrillated at 40° C. (ambient temperature) between grooved rollers as shown in FIG. 7 with pitch 1.2 mm and with 0.3 mm distance from sharp edge to sharp edge on the crests. The downstream grooved roller moves 5% faster than the upstream one. It has quite generally been found that such small velocity difference helps to make the embossment (the segmental stretching) even. In immediate succession to these grooved rollers the tubular film is taken through a pair of intermeshing, driven grooved rollers of pitch 15 mm having rounded crests, adjusted to transform the fine pleating to a coarser pleating without performing any further segmental stretching. This has also generally been found to help making the product even, when the segmental stretching takes place before the longitudinal stretching. As mentioned in the general description, a longitudinal stretching is preferably started in pleated state, however it was found that very fine pleats tend to change during the route to the stretching rollers and form a more irregular and coarse pleating.

The coarsely but evenly pleated tubular film proceeds to a series of driven smooth rollers, kept at the mentioned temperature 40° C., and adjusted to stretch the film in the ratio 2:4:1. From this unit the film proceeds to a series of stabilization rollers in which it is stabilized at 90° C. without any further stretching, is cooled to about 20° C. on a water-cooled roller and finally spooled up.

In a separate process line the tubular, oriented film with bosses is helically cut at an angle of 45°, and in a third separate process line two such helically cut films are crosslaminated under pressure at a temperature about 100° C. Shrinkage is avoided upstream of the roller nip and allowed as the laminate leaves this nip. The lamination pressure is adjusted to a low value to obtain maximum tear propagation resistance without disrupting the structure. The laminate hereby became relatively strongly bonded boss to boss all over.

A part of the mainly longitudinally oriented film was also used to make a crosslaminate of the type in which ply A is oriented in the machine direction, and ply B is oriented in the transverse direction. To make such ply B in simple way for laboratory purposes, the mainly longitudinally oriented film was cut into relatively short lengths, and several such lengths were heat-sealed together to make the orientation transverse. Ply A and ply B were laminated together and then allowed to shrink with the same apparatus and under the same process condition as the above mentioned 45° cut film samples. The produced structure appears from the microphoto FIG. 1.

The lamination and shrinkage was carried out with the laboratory apparatus shown in FIG. 11, and shall now be described in further detail.

The plies A and B are brought together on the idle roller (10), pass over the idling transfer roller (11), the function of which is to avoid wrinkling on the passage to the laminating rollers (12) and (13). Roller (12) is a steel roller, while roller (13) is coated with rubber of a hardness about 70 ShoreA. Both rollers are heated to give the "sandwich" of A and B the desired lamination temperature, which as mentioned is about 100° C. in this example. The distance over which A and B follow roller (12) before they get under lamination pressure in the nip between rollers (12) and (13) is adjusted to obtain weak bonding with minimum shrinkage before the nip. After the lamination, A and B still follow the hot roller (12) over a relatively long distance to become further heated and shrink in both directions. The laminate passes the idling transfer roller (14) and is wound up on reel (15). The winding tension is kept as low as possible to allow a shrinkage as high as possible under the given conditions of heating.

The bonding system is that which in the description of FIG. 3 is called bonding system 1.

Example 2

An about 0.15 mm thick 2-layers tubular film is extruded, composed as follows:
Main layer, about 80% of total:
HDPE of m.f.i.=about 0.2 and density=about 0.95 g ml$^{-1}$.
Outer surface layer=lamination layer, about 20% of total: an ethylene copolymer which starts melting at about 95° C.
Blow ratio about 1:2:1.

The lay-flat tubular film is longitudinally stretched at about 30° C. in a ratio about 3:1, as measured after relaxation and stabilization by heat. This stretching is carried out in several steps between very closely spaced stretching rollers, as known in the art. After the stretching the gauge of the film is measure to be 0.040 mm. This cold-stretched tubular film is used for all crosslaminated samples produced in this example and in Example 3.

Comparative experiments are carried out as follows:
a) the layflat longitudinally oriented tubular film is "semi-fibrillated", helically cut at an angle of 45°, and then crosslaminated,
b) similar procedure as under a) except that the film is not "semi-fibrillated",
c) like procedure a) but the cutting angle is 63° which the inventor normally prefers,
d) similar procedure as under c) except that the film is not "semi-fibrillated".

The "semi-fibrillation" (segmental stretching between grooved rollers) is carried out as described in Example 1, but it is noted that in Example 1 the semi-fibrillation is carried out prior to the longitudinal cold-stretching, and in this (and the next) example after the longitudinal cold-stretching. The lamination plus shrinkage is carried out as explained in Example 1, except that the film temperature during lamination is slightly higher, namely 105° C. The bonding system is that which in the description is called bonding system 1.

Details of process conditions and test results appear from the tables after Example 5. The comparison between "semi-fibrillated" and "no-semi-fibrillated" samples are here based on the tear propagation resistance, as measured by a modified tongue tearing test. The modifications, compared to the ASTM method, consist in a higher tearing velocity (see the tables) and different dimensions of the specimens, namely: sample size 100 mm×100 mm and depth of incision 30 mm. The results of the tear testing appearing from the tables show a significant positive effect of the thinner webs produced by the "semi-fibrillation". In addition to this, the samples which are not "semi-fibrillated" show a very strong tendency to curling, while the "semi-fibrillated" samples do practically not show such tendency. Finally the "semi-fibrillated" samples show an elegant textile-like pattern due to the different appearance of the microvoiding in the bosses and in the thinner webs. This effect of textile-like appearance is relatively weak, which may be preferable, but if a dominating textile-look is wanted it can be achieved by adding pigment in the extrusion process.

Examinations in cross-sections in microscope show that the thickness of the thin webs on the average is 30% of the thickness of the adjacent bosses, and the width of the thin webs on the average is 30% of the width of adjacent bosses, thus the volume of the thin webs is about 9% of the volume of the bosses.

Example 3

This is carried out like Example 2, except for the lamination process which now takes place by the spot-bonding which in the description of FIG. 3 is referred to as "bonding system 3". Only film cut at an angle of 63° is laminated. As in Example 2 crosslaminates with "semi-fibrillated" plies and crosslaminates with "non-semi-fibrillated" plies are compared.

Figure 11:
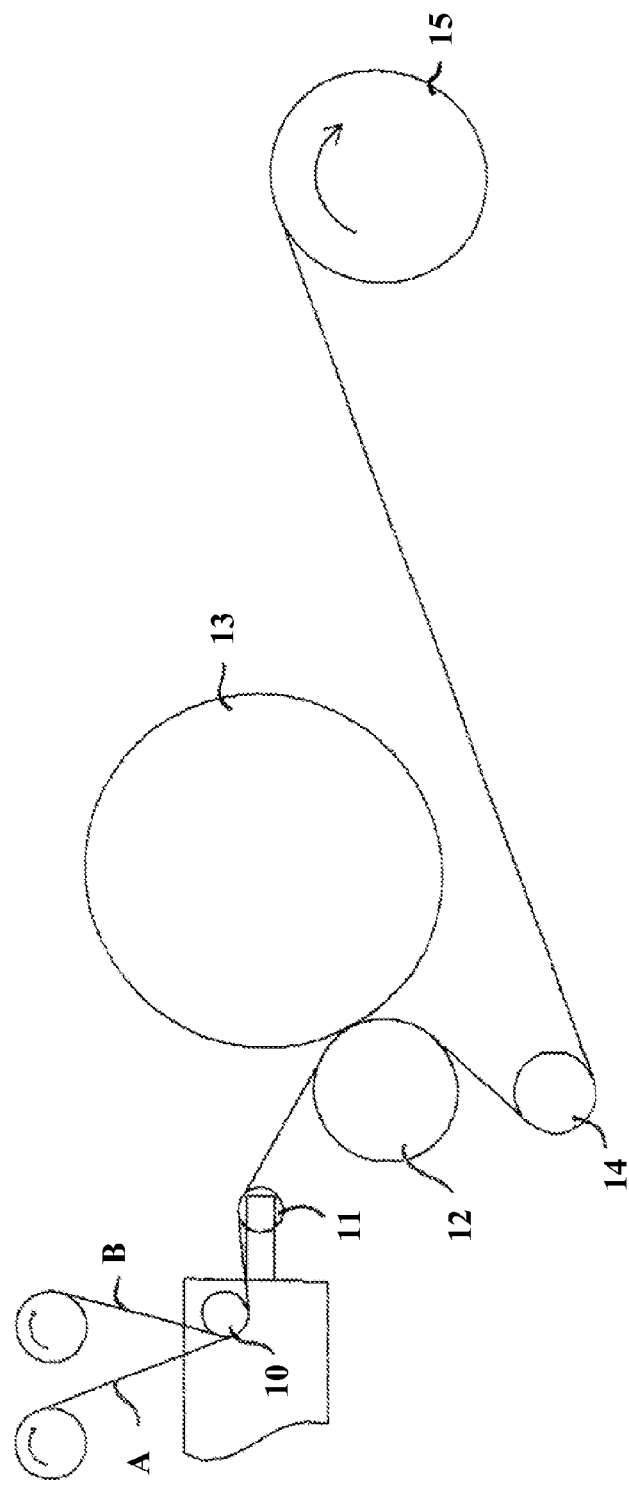
FIGS. 11 and 12 show two lines of rollers for lamination and shrinkage on laboratory scale. These are described in connection with the examples.

The lamination/shrinking process and apparatus deviates from what is described in Example 1 with reference to FIG. 11, in that the rollers (12) and (13) are adapted to produce spot-bonding. The lamination roller (12) is a grooved roller with circular grooves of pitch 1.5 mm, having 0.5 mm thick, flat crests. The rubber-coated lamination roller (13) is also a grooved roller, but with axially extending grooves, pitch about 1.5 mm and having about 0.7 mm thick, flat crests. The hardness of these teeth is about 70 shoreA.

The temperature of the plies during lamination is adjusted to 105° C. The lamination pressure and the tension at which the laminated film is drawn from roller (13) are kept low.

The comparative experiments are chosen as follows:
e) the layflat longitudinally oriented tubular film is "semi-fibrillated", helically cut under 63°, and then crosslaminated,
f) similar procedure as under e) except that the film is not "semi-fibrillated".

Further details of the process and the comparative test results in form of tear propagation resistance under fast tearing, appear from the tables after Example 5. Also in this example the "semi-fibrillated" samples are very clearly stronger in this respect than the "non-semi-fibrillated". The dimensions of the thin webs and the bosses when studied in microscope, appear equal to the dimensions found in Example 2.

Example 4

This example illustrates the manufacture of a very thin crosslaminate according to the invention, with the bonding system which in the description of FIG. 3 is called "bonding system 2".

The extruded tubular film has a thickness of only 0.015 mm.
Composition:
Main layer 60% of total:
HDPE of d=0.95 and m.f.i.=0.2.
Inner surface layer (heat-seal layer) 20% of total: LLDPE of m.f.i.=1.0.
Outer surface layer (lamination layer) 85% LLDPE (m.f.i.=1.0)+15% metalocene LLDPE (m.f.i.=1.0).

This metalocene LLDPE has melting range about 50-60° C. The blow ratio during extrusion was about 2:1 and the drawdown ratio about 40:1. The layflat tube was longitudinally stretched in a line, in which it first was supplied with fine pleats. Such "pleat-stretching" has been mentioned in the general description. The stretching took place between rubber-coated rollers of diameter only about 30 mm, which were supported by heavier rollers.

After this stretching this tubular film was "semifibrillated" exactly as in Examples 2 and 3, and then helically cut at an angle 63°.

Figure 12:
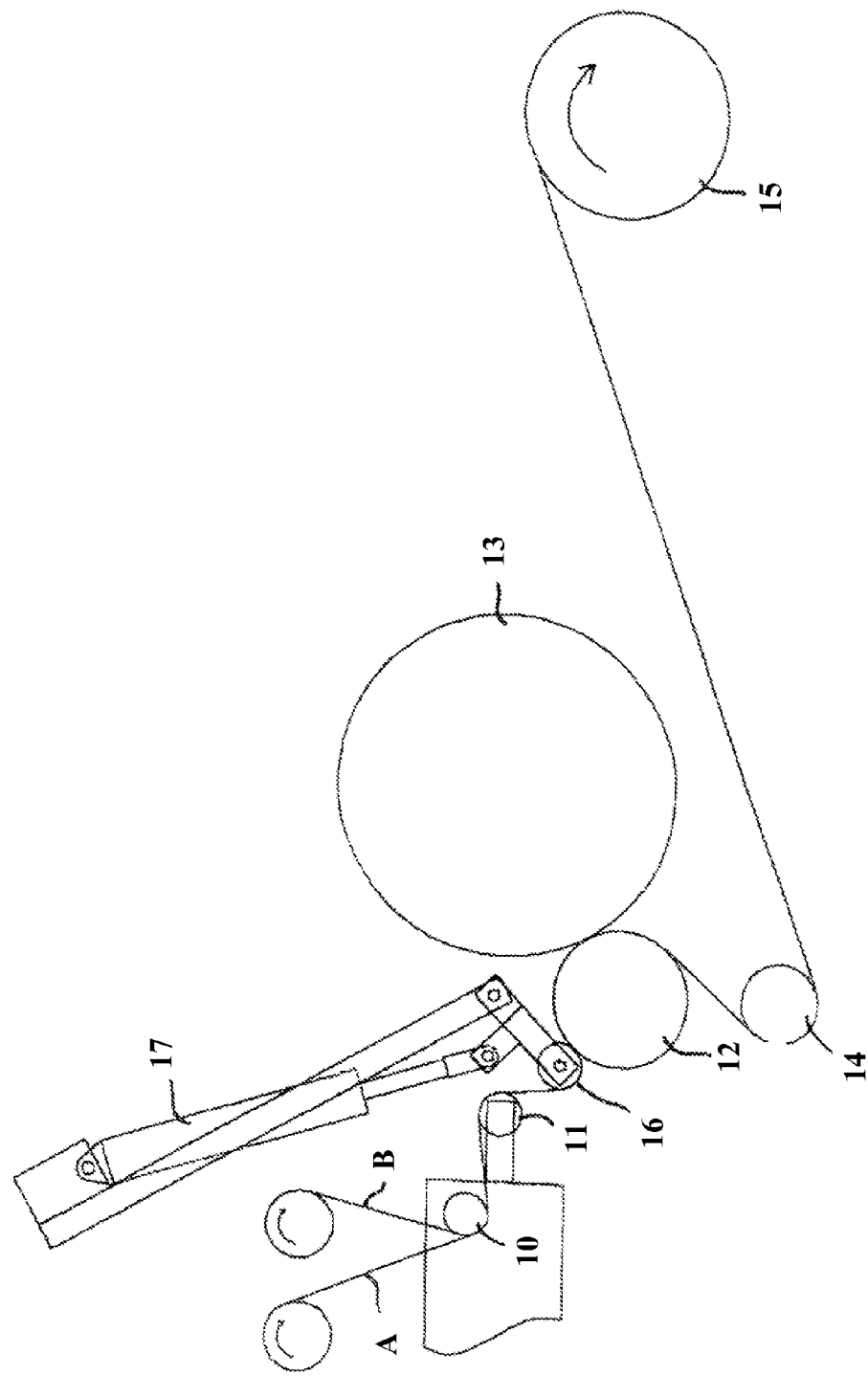

The lamination without shrinkage was carried out as a separate, first lamination process by means of the apparatus shown in FIG. 12, and an after-lamination plus shrinkage process was carried out by means of the apparatus shown in FIG. 11.

The apparatus of FIG. 12 deviates from that of FIG. 11 by a first lamination counter roller (16), rubber-coated and not heated, which serves to eliminate air entrapment and bring the plies in good contact with the hot roller (12). Roller (16) is mildly pressed towards roller (12) by pneumatic mean (17).

Final gauge of laminate: 19 µm.

In this example the film temperature during lamination has been only 70° C. to avoid irregular shrinkage. After lamination (i.e. stronger bonding) with the apparatus of FIG. 11, was carried out with the laminate heated to about 90° C. Further details of the process appear from the tables. The manufactured crosslaminate had average gauge 19 µm.

Examination of cross-sections in microscope show that the thickness of the thin webs on average is 25% of the thickness of the adjacent bosses, and the width of the thin webs on average is 20% of the width of the adjacent bosses, thus the volume of the thin webs is about 5% of the volume of the bosses.

Example 5

This example illustrates the manufacture of a similarly thin crosslaminate according to the invention, but with the bonding system which in the description of FIG. 3 is called "bonding system 5".

Regarding film composition, extrusion conditions and "semi-fibrillation", the example is similar to Example 4, but the lamination was carried out at 70° C., practically without shrinkage with the apparatus of FIG. 11.

After lamination and after shrinkage was not applied. In order to obtain a suitable, not too high and not too low bonding strength, the contents of the metalocene LLDPE in the coextruded lamination layer, which in Example 4 was 15%, was in this example increased to 30%.

Final gauge of laminate: 19 μm.

The dimensions of the thin webs and the bosses, when studied in microscope appear equal to the dimensions found in Example 4.

TABLE OF TEARING RESULTS m.d.=machine direction t.d.=transverse direction d.d.=diagonal direction a) Cutting Angle 45°, not "semi-fibrillated", smooth lamination rollers, final gauge 0.08 mm
b) Cutting Angle 45°, "semi-fibrillated", smooth lamination rollers, final gauge 0.06 mm
c) Cutting Angle 63°, not "semi-fibrillated", smooth lamination rollers, final gauge 0.08 mm
d) Cutting Angle 63°, "semi-fibrillated", smooth lamination rollers, final gauge 0.06 mm
e) Cutting Angle 63°, not "semi-fibrillated", corrugated lamination rollers, final gauge 0.08 mm
f) Cutting Angle 63°, "semi-fibrillated", corrugated lamination rollers, final gauge 0.06 mm Tearing velocity: 15 cm per sec.

In the calculations of % improvements the 25% reduction of gauge by the "semifibrillation" has been considered.

|   |      | 1st test (N) | 2nd test (N) | 3rd test (N) | 4th test (N) | average (N) | % improvement |
|---|------|------|------|------|------|------|------|
| a) | m.d. | 3.0  | 4.0  | 3.0  |      | 3.3  |      |
| b) | m.d. | 10.0 | 6.0  | 9.0  |      | 8.3  | 235  |
| a) | t.d. | 3.6  | 4.9  | 3.0  |      | 3.8  |      |
| b) | t.d. | 6.8  | 6.3  | 5.2  |      | 6.1  | 115  |
| a) | d.d. | 3.8  | 3.2  | 3.9  |      | 3.6  |      |
| b) | d.d. | 7.6  | 5.6  | 6.0  |      | 6.4  | 140  |
| c) | m.d. | 9.2  | 5.6  | 6.5  |      | 7.1  |      |
| d) | m.d. | 10.5 | 8.0  | 20.0 |      | 12.8 | 140  |
| c) | t.d. | 5.0  | 2.8  | 6.5  |      | 4.8  |      |
| d) | t.d. | 22   | 35   | 11.5 |      | 22.8 | 535  |
| c) | d.d. | 6.5  | 4.0  | 8.0  |      | 6.2  |      |
| d) | d.d. | 14.2 | 11.0 | 10.5 |      | 11.9 | 155  |
| e) | m.d. | 26.0 | 24.3 |      |      | 25.2 |      |
| f) | m.d. | 27.0 | 52.0 | 45.0 |      | 41.3 | 120  |
| e) | t.d. | 20.0 | 21.2 | 27.0 | 13.0 | 20.3 |      |
| f) | t.d. | >40  | 15.0 | 27.0 | >47  | >32.3 | 115 |
| e) | d.d. | 39   | 37   | 8.0  |      | 28   |      |
| f) | d.d. | 15.5 | 79   | 46   | 74   | 53.6 | 150  |

Table of measurements of stretching and shrinkage

The percentages relate to the dimensions of the extruded films before the mentioned process step.

TABLE OF MEASUREMENTS OF SHRINKAGE AND STRETCHING

|  | Example 4 | Example 5 | Example 2 Sample a) | Example 2 Sample b) | Example 2 Sample c | Example 2 Sample d) | Example 3 Sample e) | Example 3 Sample f) |
|---|---|---|---|---|---|---|---|---|
| Width | | | | | | | | |
| after m.d. stretching | 80% | 79% | | | | | | |
| after segmental stretching | 140% | 152% | | 135% | | 138% | | 136% |
| after lamination | 95% | 89% | 96% | 93% | 90% | 88% | 86% | 85% |
| after "after-shrinkage" | 93% | | | | | | | |
| Length | | | | | | | | |
| after m.d. stretching | 190% | 195-180% | | | | | | |
| after segmental stretching | 95% | 97% | | 100% | | 100% | | 100% |
| after lamination | 98% | 96% | 95% | 90% | 100% | 98% | 98% | 95% |
| after "after-shrinkage" | 99% | | | | | | | |

I claim:

1. A crosslaminate comprising at least two oriented plies A and B, each comprising a thermoplastic polymer material, each biaxially oriented with one direction dominating and in which the ply A is heat sealed to the ply B through one or more lamination layers to form either (1) a weak bonding between the plies all over, or (2) a pattern of bonding including alternating bonding regions and non bonding regions or alternating strong bonding regions and weak bonding regions, and whereby the ply A and the ply B each comprises an array of linear bosses distributed over a film surface with a division no larger than about 2 mm, integrally connected by thinner linear webs (4) which each by volume is less than 50% of the average of the two adjacent bosses, and delineations between the bosses and adjacent thinner webs that comprise locations where a ply thickness is an average between a thickest part of the boss and a thinnest part of the web, and whereby a main cross-sectional portion of each boss is uniaxially oriented sufficiently to achieve a dominating direction of orientation of the ply A, while the thinner webs are biaxially oriented, wherein even distribution over an area of the laminate at least 50% of the areas of the thinner linear webs in the ply A and in the ply B are non bonded or are weakly bonded such that a majority of each boss to boss bond, is at least as strong as a strongest bond of an immediate adjacent thin web to thin web bonds as determined by peeling at room temperature.

2. The crosslaminate according to claim 1, wherein either the bonding defines a bonding system, which is confined to the bosses alone, or the bonding boss to boss is stronger than the bonding between adjacent thinner webs.

3. The crosslaminate according to claim 2, wherein the bonding system is confined to regions comprising a plurality of bosses and thinner webs, while the remainder of the area of the laminate is unbonded.

4. The crosslaminate according to claim 2, wherein the thinner webs are substantially non-bonded all over, and the bosses are substantially bonded all over, and where the boss to boss bonds are stronger within regions which each comprise several bosses and several thinner webs, than the strength of the bonding boss to boss outside these regions.

5. The crosslaminate according to claim 1, wherein there are two series of bosses X and Y where the bosses X are thicker than the bosses Y, whereby each thinner web (4) is adjacent to one boss X and one boss Y, and that either the bonding is confined to the bosses X alone, or the bonding of boss X to boss X is stronger than the bonding of boss Y to boss Y.

6. The crosslaminate according to claim 1, wherein within regions evenly distributed over the area of the laminate and each comprising several bosses and several thinner webs, the plies are so strongly bonded that the bonded portions cannot be peeled apart after repeated flexing and rubbing, while in the remainder of the laminate A and B are unbonded or so weakly bonded that the bond can be eliminated by such treatment.

7. The crosslaminate according to claim 1, wherein the laminate comprises unbonded regions which form slacks, where a slack extent is limited such that when viewed in a section perpendicular to an extension of the bosses and the webs, a width of the slack measured along the actual film surface, is at the highest 0.5 mm larger than a direct distance between boundaries of the slacks.

8. The crosslaminate according to claim 1, wherein an average thickness of each thinner web is no larger than 80% of an maximum thickness of its adjacent bosses.

9. The crosslaminate according to claim 1, wherein a width of the bosses is no more than about 1 mm.

10. The crosslaminate according to claim 1, wherein a width of each thinner region is at least about 50% of a maximum thickness of the two adjacent bosses.

11. The crosslaminate according to claim 1, wherein a degree of uniaxial orientation in the bosses and the temperatures at which this has been established have been limited to such an extent that during slow tear propagation each of the plies A and B reorients instead of fibrillating in a location where the tear propagates.

12. The crosslaminate according to claim 1, wherein its average thickness is no larger than around 0.05 mm.

13. The crosslaminate according to claim 1, wherein the lamination layer is a coextruded layer on the ply A and/or the ply B.

14. The crosslaminate according to claim 1, wherein the lamination layer has been applied by extrusion lamination.

15. The crosslaminate according to claim 1, wherein the ply A and/or the ply B comprises mainly high or medium high molecular weight HDPE or high or medium high molecular weight crystalline PP.

16. The crosslaminate according to claim 1, wherein the ply A and the ply B are supplied with microvoids which in the thinner webs may pierce the plies to make the crosslaminate breathable.

17. The crosslaminate according to claim 1, further comprising microperforations.

18. The crosslaminate according to claim 17, wherein the microperforations are confined to the thinner webs.

19. The crosslaminate according to claim 1, wherein the laminate comprises non bonded regions which form slacks, where a slack extent is limited such that when viewed in a section perpendicular to an extension of the bosses and the webs, a width of the slack measured along the actual film surface, is at the highest 0.3 mm larger than a direct distance between boundaries of the slacks.

20. The crosslaminate according to claim 1, wherein the laminate comprises non bonded regions which form slacks, where a slack extent is limited such that when viewed in a section perpendicular to an extension of the bosses and the webs, a width of the slack measured along the actual film surface, is at the highest 0.2 mm larger than a direct distance between boundaries of the slacks.

21. The crosslaminate according to claim 1, wherein an average thickness of each thinner web is between 25-50% of an maximum thickness of its adjacent bosses.

22. The crosslaminate according to claim 1, wherein a width of the bosses is no more than about 0.5 mm.

23. The crosslaminate according to claim 1, wherein a width of the bosses is between about 0.05 and 0.2 mm.

24. The crosslaminate according to claim 1, wherein a width of each thinner region is no less than 25% of the average width of the two adjacent bosses.

25. The crosslaminate according to claim 1, wherein the weak bonds are such that they can be eliminated by repeated flexing and rubbing by hand.

26. A crosslaminate comprising:
at least two oriented plies A and B, each comprising:
a thermoplastic polymer material, each biaxially oriented with one direction dominating,
an array of linear bosses distributed over a film surface having a division no larger than about 2 mm,
thinner linear webs integrally connecting the bosses and having a volume less than 50% of an average of two adjacent bosses, and
delineations between bosses and adjacent thinner webs comprise locations where a ply thickness is an average of a thickest part of the bosses and a thinnest part of the thinner webs,
where a main cross-sectional portion of each boss is sufficiently uniaxially oriented to achieve a dominating direction of orientation of the ply A, while the thinner webs are biaxially oriented,
where the ply A is heat sealed to the ply B through one or more lamination layers to form a bonding system where the thinner webs are substantially non-bonded all over, and the bosses are substantially bonded all over and where boss to boss bonds are stronger within regions comprising a plurality of bosses and thinner webs, than boss to boss bonds outside these regions, and
where the thinner webs are evenly distributed over an area of the laminate.

27. A crosslaminate comprising:
at least two oriented plies A and B, each comprising:
a thermoplastic polymer material, each biaxially oriented with one direction dominating,
an array of linear X bosses and Y bosses distributed over a film surface having a division no larger than about 2 mm between pairs of bosses,
thinner linear webs integrally connecting the X bosses the Y bosses and having a volume less than 50% of an average of two adjacent bosses, and
delineations between bosses and adjacent thinner webs comprise locations where a ply thickness is an average between a thickest part of the bosses and a thinnest part of the webs,
where a main cross-sectional portion of each boss is sufficiently uniaxially oriented to achieve a dominating direction of orientation of the ply A, while the thinner webs are biaxially oriented, where the X bosses are thicker than the Y bosses, where the ply A is heat sealed to the ply B through one or more lamination layers to form a bonding system comprising only boss to boss bonding and the boss to boss bonds are stronger than the bonding between adjacent thinner webs, where the boss to boss bonding includes either only X boss to X boss bonds or the boss X to boss X bonds are stronger than Y boss to Y boss bonds, and where the thinner webs are evenly distributed over an area of the laminate and at least 50% of the areas of the thinner webs in the ply A and in the ply B are unbonded or are weakly bonded.

28. A crosslaminate comprising:

at least two oriented plies A and B, each comprising:
- a thermoplastic polymer material, each biaxially oriented with one direction dominating,
- an array of linear bosses distributed over a film surface having a division no larger than about 2 mm,
- thinner linear webs integrally connecting the bosses and having a volume less than 50% of an average of two adjacent bosses, and
- delineations between the bosses and adjacent thinner webs comprise locations where a ply thickness is an average between a thickest part of the bosses and a thinnest part of the webs, and where a main cross-sectional portion of each boss is sufficiently uniaxially oriented to achieve a dominating direction of orientation of the ply A, while the thinner webs are biaxially oriented, where the ply A is heat sealed to the ply B through one or more lamination layers to form (1) a weak bonding all over or (2) a pattern of bonding including alternating bonding regions and unbonded regions or alternating strong bonding regions and weak bonding regions, where the unbonded regions include slacks, where an extent of the slacks is limited such that when viewed in a section perpendicular to an extension of the bosses and the webs, a width of the slacks, measured along the actual film surface, is at most 0.5 mm larger than a direct distance between boundaries of the slacks, and where the webs are evenly distributed over an area of the laminate and at least 50% of the areas of the thinner linear webs in the ply A and in the ply B are unbonded or are weakly bonded.

29. The crosslaminate according to claim 28, wherein the width of the slacks, measured along the actual film surface, is at most 0.3 mm larger than a direct distance between boundaries of the slacks.

30. The crosslaminate according to claim 28, wherein the width of the slacks, measured along the actual film surface, is at most 0.2 mm larger than a direct distance between boundaries of the slacks.

31. The crosslaminate according to claim 28, wherein the weak bonds are such that they can be eliminated by repeated flexing and rubbing by hand.

* * * * *